United States Patent
Song et al.

(10) Patent No.: US 12,393,790 B2
(45) Date of Patent: Aug. 19, 2025

(54) METHOD FOR GENERATING STORYBOARD BASED ON SCRIPT TEXT

(71) Applicant: ActionPower Corp., Seoul (KR)

(72) Inventors: Jaeyup Song, Seoul (KR); Jingu Lee, Seoul (KR); Seungho Kwak, Seoul (KR)

(73) Assignee: ActionPower Corp., Seoul (KR)

(*) Notice: Subject to any disclaimer, the term of this patent is extended or adjusted under 35 U.S.C. 154(b) by 0 days.

(21) Appl. No.: 18/749,064

(22) Filed: Jun. 20, 2024

(65) Prior Publication Data

US 2024/0428016 A1 Dec. 26, 2024

(30) Foreign Application Priority Data

Jun. 22, 2023 (KR) ........................ 10-2023-0080428

(51) Int. Cl.
  *G06F 40/40* (2020.01)
  *G06F 40/295* (2020.01)
  *G06T 11/00* (2006.01)
  *G06F 40/166* (2020.01)

(52) U.S. Cl.
  CPC ............ *G06F 40/40* (2020.01); *G06F 40/295* (2020.01); *G06T 11/00* (2013.01); *G06F 40/166* (2020.01)

(58) Field of Classification Search
  CPC ...... G06F 40/40; G06F 40/295; G06F 40/166; G06T 11/00
  USPC ............................................................ 704/9
  See application file for complete search history.

(56) References Cited

U.S. PATENT DOCUMENTS

| | | |
|---|---|---|
| 9,106,812 B1 | 8/2015 | Price et al. |
| 2019/0213253 A1 | 7/2019 | Ray et al. |
| 2023/0297608 A1 | 9/2023 | Jin et al. |
| 2025/0053370 A1* | 2/2025 | Frieder .................. G10L 17/00 |

FOREIGN PATENT DOCUMENTS

| | | |
|---|---|---|
| KR | 20200063316 A | 6/2020 |
| KR | 102275194 B1 | 7/2021 |
| KR | 102293166 B1 | 8/2021 |
| KR | 20220051575 A | 4/2022 |
| KR | 102473475 B1 | 12/2022 |
| KR | 20230079751 A | 6/2023 |

* cited by examiner

*Primary Examiner* — Thierry L Pham
(74) *Attorney, Agent, or Firm* — Seed IP Law Group LLP

(57) ABSTRACT

Disclosed is a method for generating a storyboard based on a script text, which is performed by a computing device. The method may include obtaining the script text. The method may include performing clustering for text parts included in script text based on location information. The method may include determining a prompt information for each cluster generated by clustering based on the location information. The method may include generating the storyboard for each cluster based on the determined prompt information.

20 Claims, 7 Drawing Sheets

METHOD FOR GENERATING STORYBOARD BASED ON SCRIPT TEXT

CROSS-REFERENCE TO RELATED APPLICATIONS

This application claims priority to and the benefit of Korean Patent Application No. 10-2023-0080428 filed in the Korean Intellectual Property Office on Jun. 22, 2023, the entire contents of which are incorporated herein by reference.

BACKGROUND

Technical Field

The present disclosure relates to a method for generating a storyboard based on a script text, and more particularly, to a technology of determining prompt information based on a reconfigured script text, and generating a storyboard for a script text by using the determined prompt information and a generation model.

Description of the Related Art

In recent years, as various OTT services such as Netflix and Disney+ have gained popularity, contents such as dramas and movies are gaining popularity around the world. However, content creation requires relatively much time and effort.

In order to solve such a problem, research is needed on how to create a storyboard by reconfiguring a script-type text by location so that filming can be done efficiently in one location upon filming.

Korea Patent Unexamined Publication No. 10-2023-0079751 (Jun. 7, 2023) discloses a conti generation method.

BRIEF SUMMARY

The present disclosure has been made in an effort to provide a method for generating a storyboard based on a script text, which can automatically generate a storyboard for each scene by reconfiguring the script text by location and determining key prompt information.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method for generating a storyboard based on a script text, which is performed by a computing device. The method may include: obtaining the script text; performing clustering for text parts included in the script text based on location information; determining a prompt information for each cluster generated by clustering based on the location information; and generating the storyboard for each cluster based on the determined prompt information.

In an exemplary embodiment, the method may further include segmenting the script text into the text parts after obtaining the script text, and the segmenting of the script text into the text parts may include at least one of segmenting the script text into the text parts based on a scene information of the script text, or segmenting the script text into the text parts using a text segmentation module.

In an exemplary embodiment, the segmenting of the script text into the text parts based on the scene information of the script text may include identifying each text part corresponding to each scene number based on the scene number included in the script text.

In an exemplary embodiment, the segmenting of the script text into the text parts using the text segmentation module may include identifying a point where a similarity between adjacent sentences in the script text is less than a threshold, and segmenting the script text into a plurality of parts based on the identified point.

In an exemplary embodiment, the performing for the clustering for the text parts included in the script text based on the location information may include performing clustering so that text parts associated with a same location are included in the same cluster, based on each location information associated with each text part.

In an exemplary embodiment, the location information associated with each text part may be obtained based on at least one of location information written next to the scene number corresponding to each text part, or each location classification information obtained by inputting each text part into a location classification model, and a plurality of classes of the location classification model may correspond to a plurality of locations appearing in the script texts.

In an exemplary embodiment, the determining of the prompt information for each cluster may include individually determining each prompt information for each text part included in each cluster.

In an exemplary embodiment, the generating of the storyboard for each cluster based on the determined prompt information may include generating each image storyboard for each text part included in each cluster based on each individually determined prompt information.

In an exemplary embodiment, the individually determining of each prompt information for each text part included in each cluster may include individually determining each prompt information based on at least one of image number information for each text part, person information related to each text part, object information related to each text part, or positional information of a person or object related each text part.

In an exemplary embodiment, the image number information for each text part may be determined based on the length of each text part, the number of persons related to each text part, the number of objects related to each text part, or the number of times a topic is switched in each text part.

In an exemplary embodiment, the person information related to each text part is obtained based on at least one of an output generated by inputting each text part into a natural language processing model or speaker information included in the script text.

In an exemplary embodiment, the object information related to each text part may be obtained based on at least any one of A keyword extraction model based on Term Frequency-Inverse Document Frequency (TF-IDF) and Topic Segmentation, and a Large Language Model (LLM).

In an exemplary embodiment, the positional information of the person or object related to each text part may be determined based on frequency information of the person or object in each text part, and positional information of a person or object with a highest frequency may be set at a center.

In an exemplary embodiment, the determining of the prompt information for each cluster may include determining integrated prompt information for each cluster based on the text parts included in each cluster, and the generating of the storyboard for each cluster based on the determined prompt information may include generating each image storyboard for each text part included in each cluster based on the determined integrated prompt information.

In an exemplary embodiment, the method may include determining cluster-condition information for each cluster based on the location information associated with each cluster, and the cluster-condition information may include information that is not included in the script text, and the generating of the storyboard for each cluster based on the determined prompt information may include generating the storyboard for each cluster based on the determined prompt information and the cluster-condition information.

Another exemplary embodiment of the present disclosure provides a method for generating learning data for an artificial intelligence model, which is performed by a computing device. The method may include: performing clustering for text parts included in a script text based on location information; determining a prompt information for each cluster generated by clustering based on the location information; generating the storyboard for each cluster based on the determined prompt information; and generating the learning data including the script text and the storyboard.

Yet another exemplary embodiment of the present disclosure provides a computer program stored in a computer-readable storage medium. The computer program may allow one or more processors to perform the following operations for generating a storyboard based on a script text when the computer program is executed by one or more processors, and the operation may include: an operation of obtaining the script text; an operation of performing clustering for text parts included in the script text based on location information; an operation of determining a prompt information for each cluster generated by clustering based on the location information; and an operation of generating the storyboard for each cluster based on the determined prompt information.

In an exemplary embodiment, the operations may further include an operation of segmenting the script text into the text parts after obtaining the script text, and the operation of segmenting the script text into the text parts may include at least one of an operation of segmenting the script text into the text parts based on a scene information of the script text, or an operation of segmenting the script text into the text parts using a text segmentation module.

In an exemplary embodiment, the operation of performing for the clustering for the text parts included in the script text based on the location information may include an operation of performing clustering so that text parts associated with a same location are included in the same cluster, based on each location information associated with each text part.

In an exemplary embodiment, the operation of determining the prompt information for each cluster may include an operation of individually determining each prompt information for each text part included in each cluster.

In an exemplary embodiment, the operation of determining the prompt information for each cluster may include an operation of determining integrated prompt information for each cluster based on the text parts included in each cluster, and the operation of generating the storyboard for each cluster based on the determined prompt information may include an operation of generating each image storyboard for each text part included in each cluster based on the determined integrated prompt information.

In an exemplary embodiment, the operations may include an operation of determining cluster-condition information for each cluster based on the location information associated with each cluster, and the cluster-condition information may include information that is not included in the script text, and the operation of generating the storyboard for each cluster based on the determined prompt information may include an operation of generating the storyboard for each cluster based on the determined prompt information and the cluster-condition information.

Still yet another exemplary embodiment of the present disclosure provides a computing device. The device may include: at least one processor; and a memory, and at least one processor may be is further configured to obtain a script text, perform clustering for text parts included in the script text based on location information, determine a prompt information for each cluster generated by clustering based on the location information, and generate the storyboard for each cluster based on the determined prompt information.

In an exemplary embodiment, the at least one processor may be additionally configured to segment the script text into the text parts after obtaining the script text, and may include at least one of an operation configured to segment the script text into the text parts based on a scene information of the script text, or an operation configured to segment the script text into the text parts using a text segmentation module.

In an exemplary embodiment, the at least one processor may be configured to perform clustering so that text parts associated with a same location are included in the same cluster, based on each location information associated with each text part.

In an exemplary embodiment, the at least one processor may be configured to individually determine each prompt information for each text part included in each cluster.

In an exemplary embodiment, the at least one processor may be configured to determine integrated prompt information for each cluster based on the text parts included in each cluster, and configured to generate each image storyboard for each text part included in each cluster based on the determined integrated prompt information.

In an exemplary embodiment, the at least one processor may be configured to determine cluster-condition information for each cluster based on the location information associated with each cluster, in which the cluster-condition information may include information that is not included in the script text, and may be configured to generate the storyboard for each cluster based on the determined prompt information and the cluster-condition information.

According to the present disclosure, since the script text is reconfigured for each location and storyboard (in other words, conti) is automatically generated for each location based on the reconfigured script text, so convenience can be improved when filming a drama or movie. In addition, according to the present disclosure, since the script text is reconfigured for each location and reconfigured for each scene related each location, and the storyboard is automatically generated for each location, and each scene related to each location based on the reconfigured script text, a content creation process can be further simplified.

Meanwhile, the effects of the present disclosure are not limited to the above-mentioned effects, and various effects can be included within the scope which is apparent to those skilled in the art from contents to be described below.

DETAILED DESCRIPTION

Figure 1:
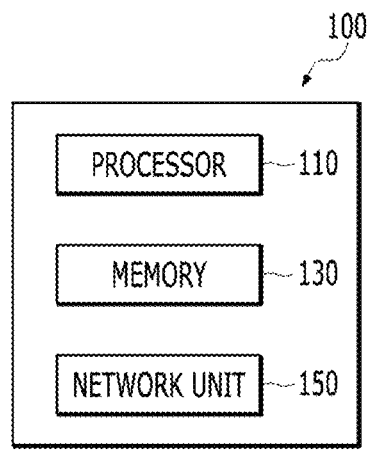
FIG. 1 is a block diagram of a computing device for generating a storyboard based on a script text according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for generating a storyboard based on a script text according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an embodiment of the present disclosure, the memory 130 may store any type of information generated or determined by the processor 110 or any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In this disclosure, the network unit (150) can be configured regardless of the communication mode, such as wired or wireless, and can be composed of various communication networks such as a Local Area Network (LAN), a Personal Area Network (PAN), and a Wide Area Network (WAN). Additionally, the network may be the well-known World Wide Web (WWW) and may also utilize wireless transmission technologies used for short-distance communication, such as Infrared Data Association (IrDA) or Bluetooth.

The techniques described herein may be used in other networks in addition to those mentioned above.

Figure 2:
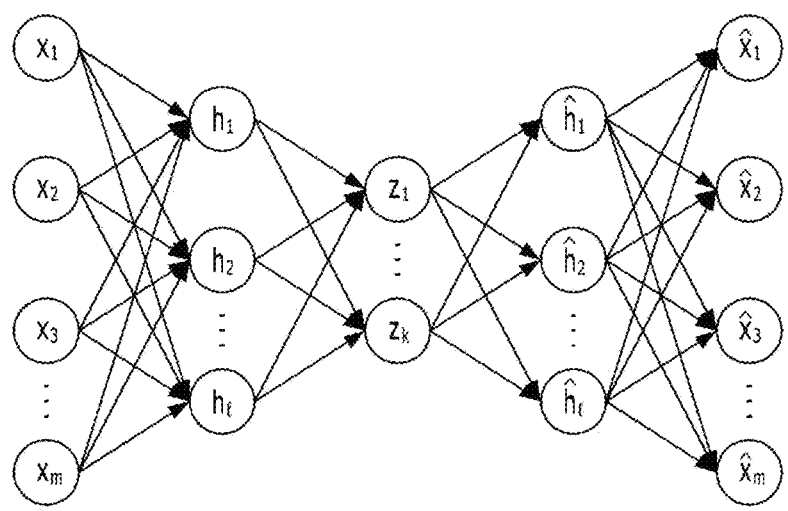
FIG. 2 is a conceptual view illustrating a neural network according to an embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

The present disclosure relates to a method for generating a storyboard based on a script text. For example, the present disclosure relates to a method for ① classifying a script text for each scene based on basic information (e.g., scene number) or text segmentation included in the script text, ② reconfiguring scenes for each scene in the same location based on text classification, ③ determining key information for generating the storyboard for each scene in scenes which are the same location, and ④ generating the storyboard for each scene by using a text-to-image model based on the key information for generating the storyboard.

Further, the present disclosure analyzes a script in the form of a script and classifies the script for each location, determines the number of image, the number of characters, and/or the number of main objects of the storyboard for each scene, and utilizes the determined numbers as prompts to generate the storyboard.

Meanwhile, the present disclosure has an effect of shortening the content creation time by helping to reconfigure the text in the form of the script for each location so that filming may be done in one location upon filming. In addition, the present disclosure may further simplify the content creation pipeline because the present disclosure automatically generates a conti (=storyboard) for actors' performances for scenes for each location.

According to an exemplary embodiment of the present disclosure, Text Segmentation & Text Classification, described below, are all technologies belonging to Natural Language Processing (NLP). The text segmentation is a technique for finding places in a text document where the similarity between texts is less than a threshold. The text segmentation is mainly used to segment paragraphs within a document in the form of line text, and when the task such as summary or the text classification is performed for each of the segmented texts after the text segmentation, performance may be improved. Additionally, the text classification refers to classifying an input text into which category the input text belongs to among predetermined candidate categories. The text classification calculates a probability that the input text will be classified into each candidate category, and output a category with the highest probability as a result value. "Text classification" described herein may include one or both of a text clustering process and a classification process of a classified cluster.

According to an exemplary embodiment of the present disclosure, prompt engineering is a task of creating or designing an effective prompt so that a language model may generate an appropriate and accurate response. For example, prompt engineering is providing a correct input or context, defining an expected output, and designing the input clearly and concisely. Since the quality of the output depends on how the prompt is input, knowledge of a domain of the task may be required. As an example, the quality of the output image may make a big difference depending on how well you input the prompts into the text-to-image model.

According to an exemplary embodiment of the present disclosure, the text-to-image model is a model that understands input text and creates an image based on the input text. For example, diffusion-based models such as OpenAI's dall-e-2, Google's imagen, midjourney's midjourney, and stability AI's stable diffusion may be included.

Figure 3:
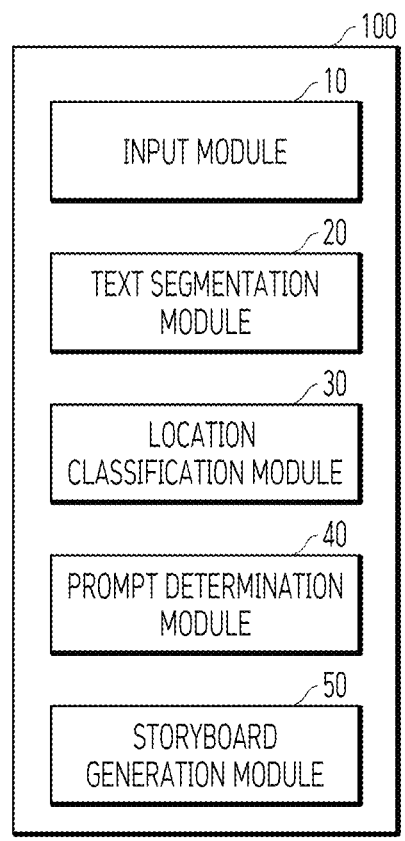
FIG. 3 is a block diagram of a plurality of modules for generating the storyboard based on the script text according to an exemplary embodiment of the present disclosure.
Figure 4:
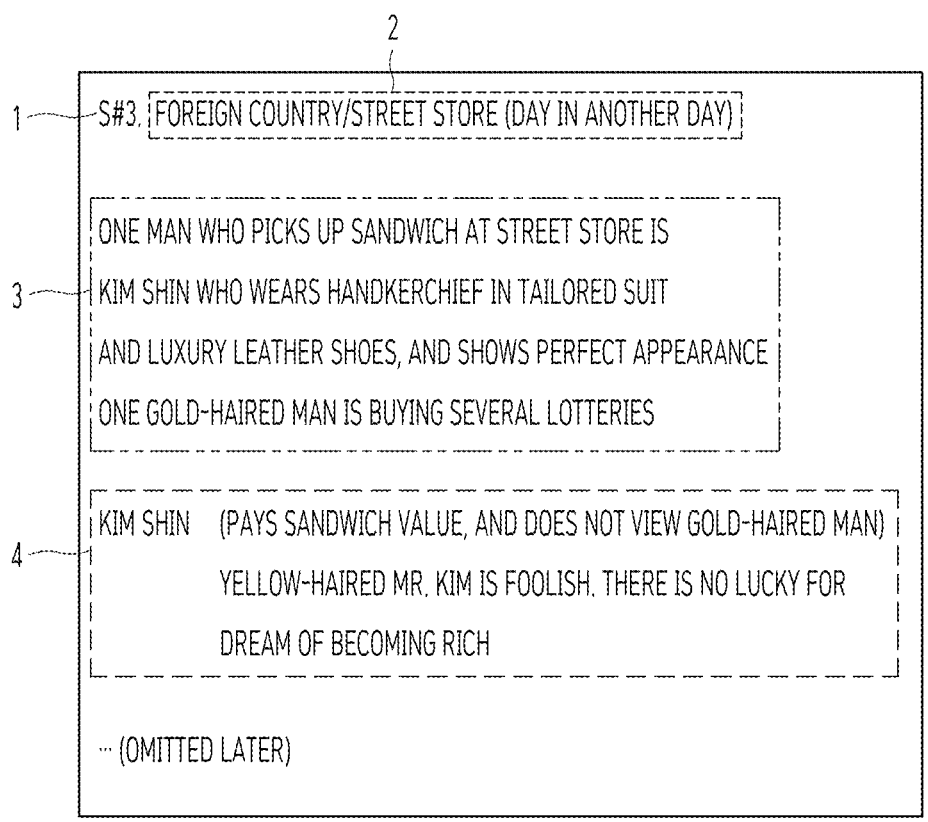
FIG. 4 is a diagram schematically illustrating a script text according to an exemplary embodiment of the present disclosure.

FIG. 3 is a block diagram of a plurality of modules for generating the storyboard based on the script text according to an exemplary embodiment of the present disclosure, and FIG. 4 is a diagram schematically illustrating a script text according to an exemplary embodiment of the present disclosure.

According to an exemplary embodiment of the present disclosure, a computing device 100 may include an input module 10, a text segmentation module 20, a location classification module 30, a prompt determination module 40, and a storyboard generation module 50. Meanwhile, multiple modules that may be included in the computing device 100 may be controlled by the processor 110 or implemented by an operation of the processor 110. Additionally, the modules that may be included in the computing device 100 for generating the storyboard based on the script text are not limited to the multiple modules described above, and may include additional modules. Hereinafter, exemplary multiple modules for generating the storyboard based on the script text will be described in more detail.

According to an exemplary embodiment of the present disclosure, the input module 10 may obtain the script text. For example, the script text may include a script text of content such as a movie or drama (e.g., a movie scenario text, a drama script text). As an example, referring to FIG. 4, the scenario may be segmented by scene, location information 2, etc., are written next to a scene number 1, and may include a narration type text 3 and a conversation type text 4. For example, the location information 2 may include a location and whether it is day or night, etc. The narration is a text that explains the scene in scenario terms. The conversation type text 4 may include speaker information. For example, the conversation type text 4 may include a dialogue text for the speaker (e.g., "Kim Shin" illustrated (4) of FIG. 4).

According to an exemplary embodiment of the present disclosure, after obtaining the script text, the text segmentation module 20 may segment the script text into text parts. According to an exemplary embodiment, the text segmentation module 20 may ① segment the script text into the text parts based on a scene information of the script text. As an example, the text segmentation module 20 may identify each text part corresponding to each scene number based on the scene number included in the script text. For example, referring to FIG. 4, when the script text includes the scene number 1, each text part corresponding to each scene number may be simply identified based on the scene number 1.

In addition, the text segmentation module 20 may ② segment the script text into the text parts using text segmentation technology. For example, unlike the script text illustrated in FIG. 4, if the script text does not include the scene number 1, the script text may be segmented into the text parts using the text segmentation technology. As an example, the text segmentation module 20 may identify a point where the similarity between adjacent sentences in the script text is less than a threshold. In addition, the text segmentation module 20 may segment the script text into the plurality of parts' based on the identified point (segment point).

According to an exemplary embodiment of the present disclosure, the location classification module 30 may perform clustering on the text parts included in the script text based on the location information. In an exemplary embodiment, the location classification module 30 may perform clustering so that text parts related to the same location are included in the same cluster, based on each location information associated with each text part. In other words, the location classification module 30 may reconfigure (cluster) scenes into the same location based on text classification.

As an example, the location information associated with each text part may i) be obtained based on the location information 2 written next to the scene number 1 corresponding to each text part. For example, referring to FIG. 4 when the location information 2 is included next to the scene number 1 in the script text, the scenes may be more simply segmented by location by using the location information 2. In other words, when the location information 2 is included next to the scene number 1 of the script text, the location classification module 30 may perform clustering so that the text parts related to the same location are included in the same cluster based on the location information 2.

In addition, the location information associated with each text part may ii) be obtained by inputting each text part into the text classification model. For reference, a plurality of classes in the text classification model may correspond to a plurality of locations appearing in the script texts. For example, when the location information 2 is not included next to the scene number 1 of the script text, the location classification module 30 categorizes the locations appearing in the obtained script text (e.g., the entire scenario) to perform the text classification for the segmented script texts. Through this, locations may be classified for each text part (e.g., scene), and clustering may be performed between text segments that are the same location.

Meanwhile, the computing device 100 performs clustering so that text parts related to the same location are included in the same cluster, thereby helping to film multiple scenes at once for each location, so when filming an actual drama or movie, there is an effect of shortening travel time and filming time.

According to an exemplary embodiment of the present disclosure, the prompt determination module 40 may determine prompt information for each cluster created by clustering based on the location information. Additionally, the prompt determination module 40 may individually determine each prompt information for each text part included in each cluster. In other words, the prompt determination module 40 may determine prompt information for generating the storyboard for each cluster clustered in the same location. The prompt determination module 40 generates individual prompt information for each text part included in each cluster (e.g., a text part corresponding to a scene, a text part corresponding to a segment generated by text segmentation). As an example, the prompt information may include key information for generating the storyboard.

According to an exemplary embodiment, the prompt determination module 40 may "individually" determine the respective prompt information based on at least one of i) image number information for each text part, ii) person information related to each text part, iii) object information related to each text part, or iv) positional information of a person or object related to each text part.

First, i) the image number information for each text part may be determined based on the length of each text part, the number of persons related to each text part, the number of objects related to each text part, or the number of times the topic is switched within each text part. In other words, the prompt determination module 40 may determine how many storyboard images are to be generated for each "scene." Alternatively, the prompt determination module 40 may determine the number of images based on various values. For example, the prompt determination module 40 may determine that the longer the text length of the scene, the greater the number of characters, and the more images are included in the storyboard. Additionally, the prompt determination module 40 may perform topic segmentation on the text part of "scene" and determine the number of images to be included in the storyboard based on the number of times the topic is switched. As an example, the prompt determination module 40 may determine the image number information for each text part for each cluster based on input through a user interface.

In addition, ii) the person information related to each text part may be obtained based on at least one of an output generated by inputting each text part into a natural language processing model or speaker information included in the script text. In other words, the prompt determination module 40 can determine the number of characters by inputting text included in a "scene" into a natural language processing model. Additionally, the prompt determination module 40 may determine the number of characters based on the number of speakers included in the conversation type text part 4 in the script text. For example, referring to FIG. 4, when the conversation type text part 4 of the script text includes speaker information (e.g., "Kim Shin" illustrated in (4) of FIG. 4), the prompt determination module 40 may determine the person information related to the text part based on the speaker information included in the script text. As an example, the prompt determination module 40 may determine the person information related to each text part for each cluster based on the input through the user interface.

In addition, iii) the object information related to each text part may be obtained based on a keyword extraction model based on Term Frequency-Inverse Document Frequency (TF-IDF). In other words, the prompt determination module 40 may determine a key object appearing in the "scene." The prompter determination module 40 may analyze the text included in the "scene" and determine the key object using TF-IDF-based keyword extraction. However, the prompt determination module 40 is not limited to this, and the prompt determination module 40 may determine the key object using latest keyword extraction algorithms in addition to the TF-IDF.

According to an exemplary embodiment, the object information related to a text part may be determined based on a method other than the keyword extraction method. As an example, the key object information may be determined based on Topic Segmentation or a general-purpose Large Language Model (LLM). As another example, the prompt determination module 40 may determine the object information related to each text part for each cluster based on the input through the user interface.

In addition, iv) the positional information of the person or object related to each text part may be determined based on frequency information of the person or object in each text part, and positional information of a person or object with the highest frequency may be set at a center. In other words, the prompt determination module 40 may determine the number of persons and the position of the key object appearing in the "scene" on the storyboard. For example, the prompt determination module 40 may determine a person or a key object that appears most frequently among texts included in the "scene" as the center position of the storyboard. As an example, the prompt determination module 40 may determine the positional information of the person or object related to each text part for each cluster based on the input through the user interface.

According to an exemplary embodiment of the present disclosure, the storyboard generation module 50 may generate the storyboard for each cluster based on the determined prompt information. Additionally, the storyboard generation module 50 may generate each image storyboard for each text part included in each cluster based on each individually determined prompt information. As an example, the storyboard generation module 50 may generate the storyboard for each cluster by inputting the determined prompt information into the generation model. As an example, the storyboard generation module 50 may generate the storyboard using the a text-to-image model as the generation model. As the text-to-image model, a diffusion model may be used. However, the text-to-image model is not limited to this, and a text-to-image model that is previously developed or will be developed in the future may be used. According to an exemplary embodiment, when the storyboard generation module 50 generates the storyboard by considering iv) the positional information of the person or object related to each text part among the determined prompt information, the storyboard generation module 50 may jointly use Control-Net for the diffusion model.

According to an exemplary embodiment of the present disclosure, as a result of clustering the text parts based on the location information, cluster A for location 1 may include text parts a1, a2, and a3. In this case, the storyboard generation module 50 may generate the storyboard for each text part based on each prompt information "individually" determined for each text part. For example, the storyboard generation module 50 may generate a storyboard of a1 by inputting prompt information a1_p of a1 into the generation model. Further, the storyboard generation module 50 may generate a storyboard of a2 by inputting prompt information a2_p of a2 into the generation model. Further, the storyboard generation module 50 may generate a storyboard of a3 by inputting prompt information a3_p of a3 into the generation model.

According to an exemplary embodiment of the present disclosure, the computing device 100 may generate, in cluster units, "integrated prompt information" for collectively generating storyboards for text parts included in the cluster. In other words, the prompt determination module 40 may determine "integrated prompt information" for each cluster based on the text parts included in each cluster. Additionally, the storyboard generation module 50 may generate each image storyboard for each text part included in each cluster based on the determined "integrated prompt information."

In an exemplary embodiment, as a result of clustering the text parts based on the location information, cluster A for location 1 may include text parts a1, a2, and a3. In this case, the storyboard generation module 50 may generate each image storyboard for each text part included in each cluster by inputting cluster-wise "integrated prompt information" into the generation model. For example, the storyboard generation module 50 inputs the determined "integrated prompt information (cluster_p)" into the generation model to generate storyboards of a1, a2, and a3 integratedly (e.g., generated jointly based on the integrated prompt information, the storyboards of a1, a2, and a3 may be generated separately).

According to an exemplary embodiment of the present disclosure, the computing device 100 may determine cluster-condition information for each cluster based on location information associated with each cluster. Here, the cluster-condition information may include information that is not included in the script text. For example, the cluster-condition information may include specific information (e.g., spatial information, interior information, background information, default object information, etc.) about a location that is not described in the script text.

In this case, the storyboard generation module 50 may generate a storyboard for each cluster based on the determined prompt information and the cluster-condition information. In other words, the storyboard generation module 50 may generate the storyboard based on the basically determined prompt information, but may also generate a storyboard in which the cluster-condition information is additionally reflected. Meanwhile, the cluster-condition information may be implemented in the form of condition information reflected in the denoising process when the storyboard generation module 50 includes a stable diffusion model. For example, the cluster-condition information may be reflected in the form of condition information in the denoising process of a multi-dimensional array related to the prompt information, based on a cross attention mechanism.

According to an exemplary embodiment of the present disclosure as such, since a storyboard for each location may be generated by reflecting the characteristics of the actual location that are not described in the script text (that is, the storyboard for each location may be generated in the form of reflecting characteristics or a situation for each location which should be separately and additionally confirmed and prepared apart based on the script text), the efficiency of actual movie or drama filming may be further improved.

In an exemplary embodiment, as a result of clustering the text parts based on the location information, cluster A for location 1 may include text parts a1, a2, and a3. Additionally, the location classification module 30 may additionally determine location-related condition information by the unit of the cluster. For example, the location classification module 30 may determine condition information C1 for cluster A based on the feature information of location 1.

According to an exemplary embodiment of the present disclosure, the prompt determination module 40 may determine the prompt "individually" in units of text parts a1, a2, and a3. Additionally, the storyboard generation module 50 may additionally determine cluster-wise condition information. In this case, the storyboard generation module 50 inputs the prompt information a1_p of the text part a1 into the generation model, and additionally reflects the cluster condition C1 into the generation model based on cross attention to generate the storyboard of the text part a1. Further, the storyboard generation module 50 inputs the prompt information a2_p of the text part a2 into the generation model, and additionally reflects the cluster condition C1 into the generation model based on cross attention to generate the storyboard of the text part a2. Further, the storyboard generation module 50 inputs the prompt information a3_p of the text part a3 into the generation model, and additionally reflects the cluster condition C1 into the generation model based on cross attention to generate the storyboard of the text part a3.

According to an exemplary embodiment of the present disclosure, the prompt determination module 40 may determine "integrated prompt information" in units of the cluster. Additionally, the storyboard generation module 50 may additionally determine the cluster-wise condition information. In this case, the storyboard generation module 50 inputs the cluster-wise integrated prompt information cluster_p into the generation model, and additionally reflects the cluster condition C1 into the generation model based on the cross attention to integratedly generate the storyboard of a1, a2, and a3.

Figure 5:
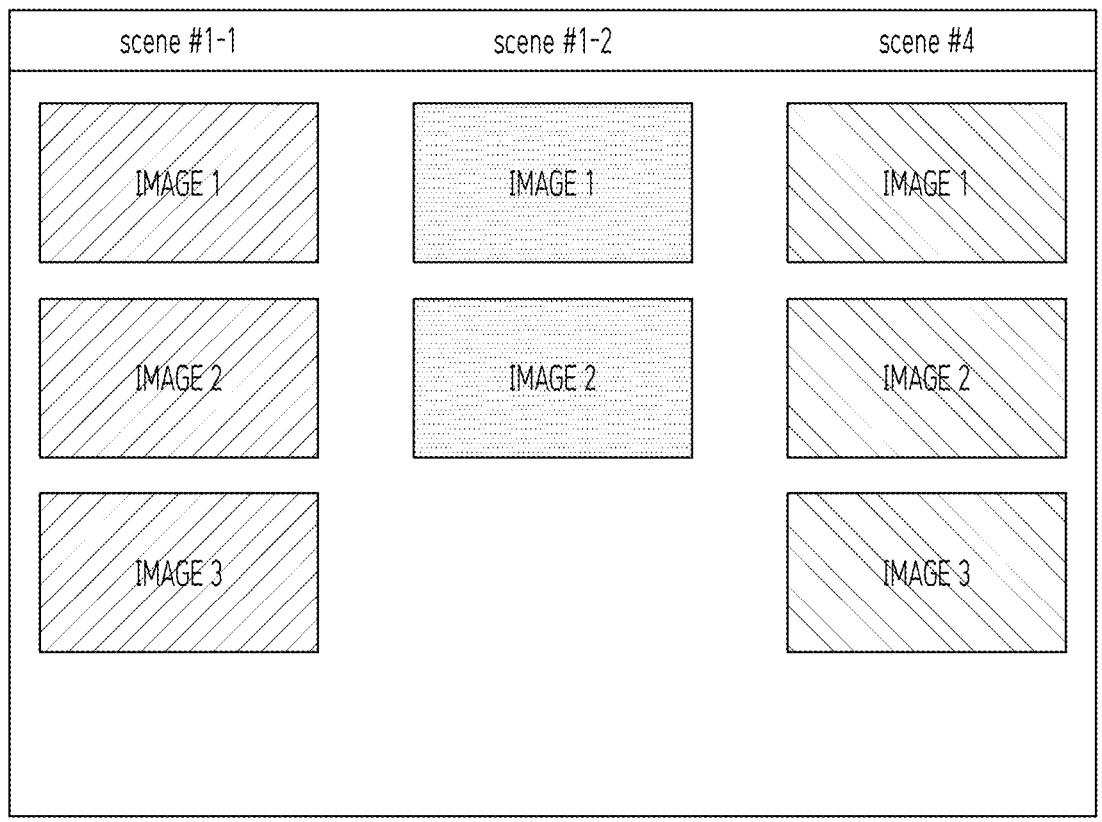
FIG. 5 is a diagram schematically illustrating the generated storyboard according to an exemplary embodiment of the present disclosure.

FIG. 5 is a diagram schematically illustrating the generated storyboard according to an exemplary embodiment of the present disclosure. In other words, FIG. 5 illustrates an example of generating the storyboard for each scene reconfigured based on the same location.

According to an exemplary embodiment of the present disclosure, hen text classification is performed in the location classification module 30 for scenes (e.g., #1-1, #1-2, #2, #3, #4, #5, . . . ) of script text segmented according to text segmentation of the text segmentation module 20, scenes for the same location, that is, a first scene (scene #1-1), a second scene (scene #1-2), and a third scene (scene #4) may be reconfigured (clustered) together as illustrated in FIG. 5. Here, the first scene (scene #1-1), the second scene (scene #1-2), and the third scene (scene #4) may be text parts included in cluster A for the same location (location 1).

According to an exemplary embodiment of the present disclosure, the prompt determination module 40 may "individually" determine the prompt for each of the first scene (scene #1-1), the second scene (scene #1-2), and the third scene (scene #4). For example, the storyboard generation module 50 inputs the individually determined prompt information to generate the storyboard for each of the first scene (scene #1-1), the second scene (scene #1-2), and the third scene (scene #4). For example, the storyboard generation module 50 may generate a storyboard including image 1, image 2, and image 3 for the first scene (scene #1-1) based on the determined prompt information. Further, the storyboard generation module 50 may generate a storyboard including image 1 and image 2 for the second scene (scene #1-2) based on the determined prompt information. Further, the storyboard generation module 50 may generate a storyboard including image 1, image 2, and image 3 for the third scene (scene #4) based on the determined prompt information.

According to an exemplary embodiment of the present disclosure, the prompt determination module 40 may determine the "integrated prompt information" in units cluster A (for example, the first scene (scene #1-1), the second scene (scene #1-2), and the third scene (scene #4). Further, the storyboard generation module 50 may integratedly generate storyboards for the first scene (scene #1-1), the second scene (scene #1-2), and the third scene (scene #4) based on the determined integrated prompt information (for example, collectively generate the storyboards based on the integrated prompt information, and generate the storyboards separately for each scene).

Figure 6:
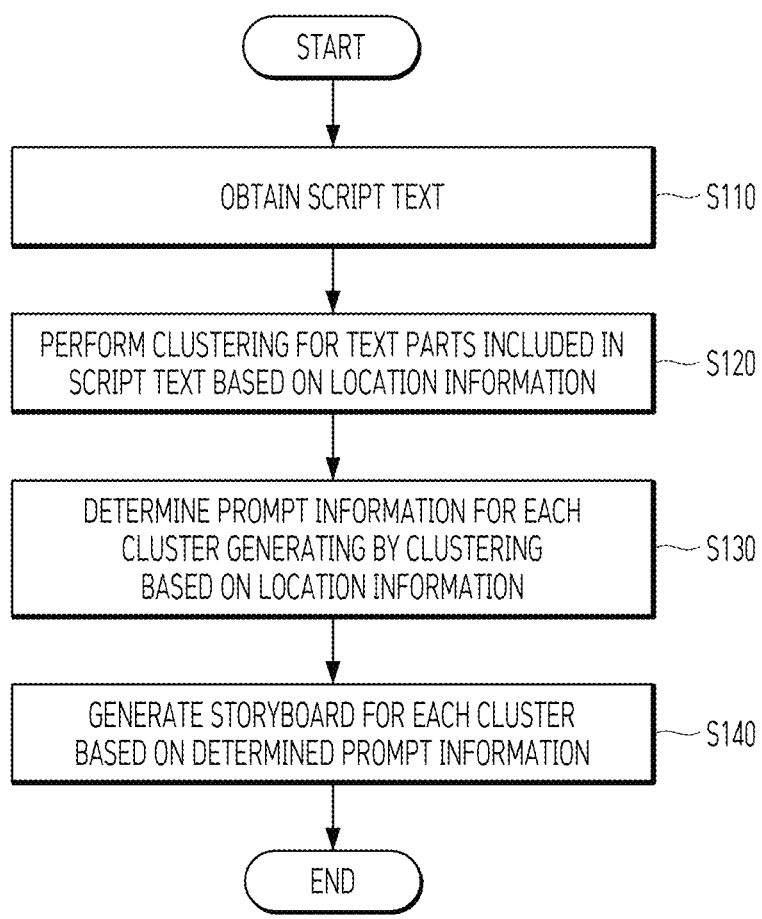
FIG. 6 is a flowchart of a method for generating a storyboard based on a script text according to an exemplary embodiment of the present disclosure.

FIG. 6 is a flowchart of a method for generating a storyboard based on a script text according to an exemplary embodiment of the present disclosure.

The method for generating a storyboard based on a script text illustrated in FIG. 6 may be performed by the computing device 100 described above. Hereinafter, in spite of contents omitted below, the contents described regarding the computing device 100 may also be similarly applied to a description of the method for generating a storyboard based on a script text.

Referring to FIG. 6, the method of generating a storyboard based on a script text may include obtaining the script text (S110), clustering text parts included in the script text based on location information (S120), determining a prompt information for each cluster generated by clustering based on the location information (S130), and generating a storyboard for each cluster based on the determined prompt information (S140).

Step S110 is a step of obtaining the script text.

According to an exemplary embodiment, the method may further include, after the obtaining of the script text (step S110), segmenting the script text into the text parts. The segmenting of the script text into the text parts may include at least one of segmenting the script text into the text parts based on a scene information of the script text, or segmenting the script text into the text parts using a text segmentation module.

Step S120 is a step of clustering the text parts included in the script text based on location information. Step S120 above may include perform clustering so that text parts related to the same location are included in the same cluster, based on each location information associated with each text part.

Step S130 is a step of determining a prompt information for each cluster generated by clustering based on the location information. Step S130 above may include individually determining each prompt information for each text part included in each cluster. Further, step S130 above may include determining integrated prompt information for each cluster based on the text parts included in each cluster, and the generating the storyboard for each cluster based on the determined prompt information may include generating each image storyboard for each text part included in each cluster based on the determined integrated prompt information.

Step S140 is a step of generating the storyboard for each cluster based on the determined prompt information.

According to an exemplary embodiment, the method may include determining cluster-condition information for each cluster based on the location information associated with each cluster, and the cluster-condition information may include information not included in the script text, and the generating of the storyboard for each cluster based on the determined prompt information may include generating the storyboard for each cluster based on the determined prompt information and the cluster-condition information.

Figure 7:
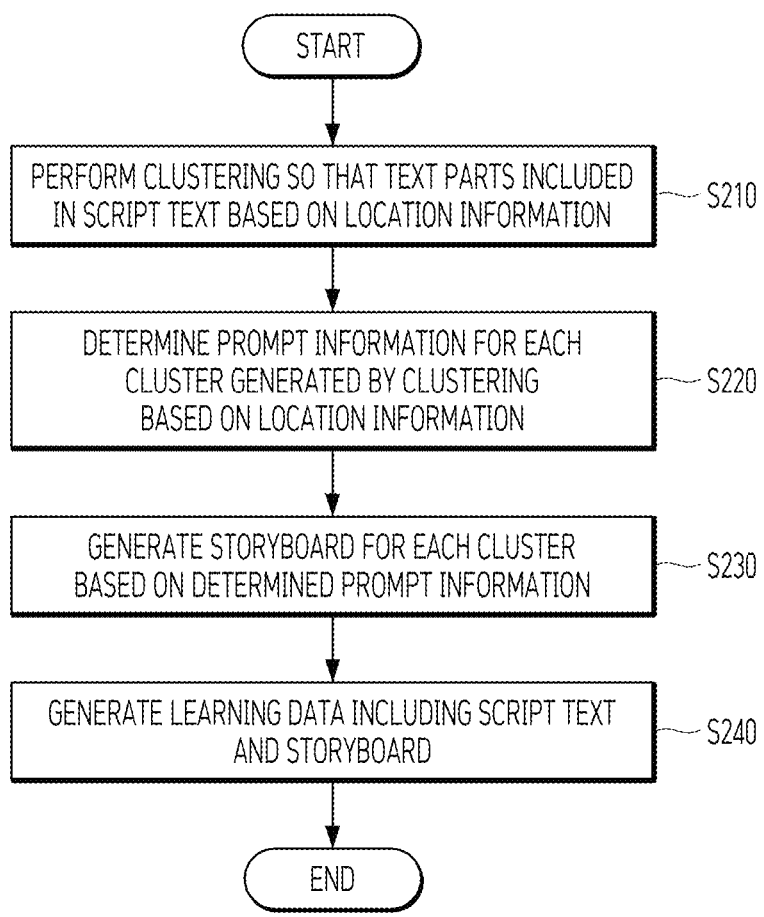
FIG. 7 is a flowchart for a method for generating learning data for an artificial intelligence model according to an exemplary embodiment of the present disclosure.

FIG. 7 is a flowchart for a method for generating learning data for an artificial intelligence model according to an exemplary embodiment of the present disclosure.

Referring to FIG. 7, the method of generating learning data for an artificial intelligence model may include clustering text parts included in a script text based on location information (S210), determining a prompt information for each cluster generated by clustering based on the location information (S220), generating a storyboard for each cluster based on the determined prompt information (S230), and generating the learning data including the script text and the storyboard (S240). The method for generating the learning data for the artificial intelligence model may be performed by a computing device 100.

Step S210 is a step of clustering the text parts included in the script text based on location information.

Step S220 is a step of determining a prompt information for each cluster generated by clustering based on the location information.

Step S230 is a step of generating the storyboard for each cluster based on the determined prompt information.

Step S240 is a step of generating the learning data including the script text and the storyboard. The script text and the storyboard pair may be used as the learning data of the artificial intelligence model.

In the above description, steps S110 to S140 may further be divided into additional steps, or combined as fewer steps according to an implementation example of the present disclosure. Further, some steps may also be omitted as necessary, and an order between the steps may be changed.

Disclosed is a computer readable medium storing the data structure according to an exemplary embodiment of the present disclosure.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 8:
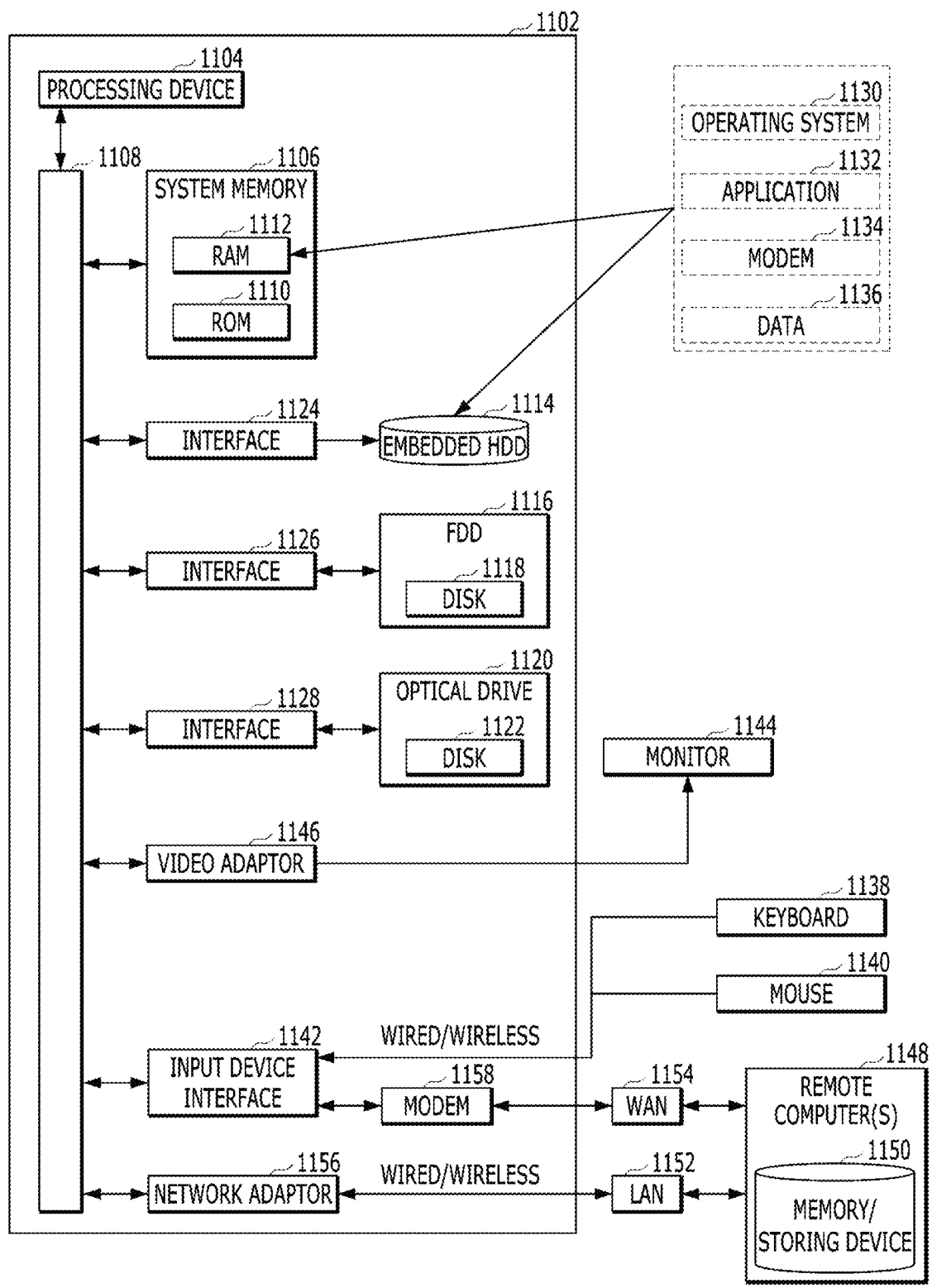
FIG. 8 is a simple and normal schematic view of an exemplary computing environment in which the exemplary embodiments of the present disclosure may be implemented.

FIG. 8 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for generating a storyboard based on a script text performed by a computing device, the method comprising:
    obtaining the script text;
    performing clustering so that text parts associated with a same location are included in a same cluster, based on each location information associated with each text part included in the script text;
    determining a prompt information for each cluster generated by clustering based on the location information; and
    generating a storyboard for each cluster based on the determined prompt information.

2. The method of claim 1, further comprising:
    segmenting the script text into the text parts after obtaining the script text,
    wherein the segmenting of the script text into the text parts includes at least one of:
    segmenting the script text into the text parts based on a scene information of the script text, or
    segmenting the script text into the text parts using a text segmentation module.

3. The method of claim 2, wherein the segmenting of the script text into the text parts based on the scene information of the script text includes:
    identifying each text part corresponding to each scene number based on the scene number included in the script text.

4. The method of claim 2, wherein the segmenting of the script text into the text parts using the text segmentation module includes:
    identifying a point where a similarity between adjacent sentences in the script text is less than a threshold, and
    segmenting the script text into a plurality of parts based on the identified point.

5. The method of claim 1, wherein the location information associated with each text part is obtained based on at least one of:
    location information written next to the scene number corresponding to each text part, or
    each location classification information obtained by inputting each text part into a location classification model, and
    a plurality of classes of the location classification model correspond to a plurality of locations appearing in the script texts.

6. The method of claim 1, wherein the determining of the prompt information for each cluster includes:
    individually determining each prompt information for each text part included in each cluster.

7. The method of claim 6, wherein the generating of the storyboard for each cluster based on the determined prompt information includes:
    generating each image storyboard for each text part included in each cluster based on each individually determined prompt information.

8. The method of claim 6, wherein the individually determining of each prompt information for each text part included in each cluster includes:
    individually determining each prompt information based on at least one of:
    an image number information for each text part,
    a person information related to each text part,
    an object information related to each text part, or
    a positional information of a person or an object related each text part.

9. The method of claim 8, wherein the image number information for each text part is determined based on at least one of:
    the length of each text part,
    the number of persons related to each text part,
    the number of objects related to each text part, or
    the number of times a topic is switched in each text part.

10. The method of claim 8, wherein the person information related to each text part is obtained based on at least one of:
    an output generated by inputting each text part into a natural language processing model, or
    a speaker information included in the script text.

11. The method of claim 8, wherein the object information related to each text part is obtained based on at least any one of:
- a keyword extraction model based on Term Frequency-Inverse Document Frequency (TF-IDF) and Topic Segmentation, or
- a Large Language Model (LLM).

12. The method of claim 8, wherein the positional information of the person or object related to each text part is determined based on a frequency information of the person or object in each text part, and
wherein a positional information of a person or object with a highest frequency is set at a center.

13. The method of claim 1, wherein the determining of the prompt information for each cluster includes:
determining an integrated prompt information for each cluster based on the text parts included in each cluster,
wherein the generating of the storyboard for each cluster based on the determined prompt information includes:
generating each image storyboard for each text part included in each cluster based on the determined integrated prompt information.

14. The method of claim 1, comprising:
determining a cluster-condition information for each cluster based on the location information associated with each cluster,
wherein the cluster-condition information includes information that is not included in the script text, and
wherein the generating of the storyboard for each cluster based on the determined prompt information includes:
generating the storyboard for each cluster based on the determined prompt information and the cluster-condition information.

15. A method for generating learning data for an artificial intelligence model, which is performed by a computing device, the method comprising:
performing clustering so that text parts associated with a same location are included in a same cluster, based on each location information associated with each text part included in the script text;
determining a prompt information for each cluster generated by clustering based on the location information;
generating a storyboard for each cluster based on the determined prompt information; and
generating the learning data including the script text and the storyboard.

16. A computing device comprising:
a processor including one or more cores; and
a memory,
wherein processor is configured to:
obtain a script text,
perform clustering so that text parts associated with a same location are included in a same cluster, based on each location information associated with each text part included in the script text,
determine a prompt information for each cluster generated by clustering based on the location information, and
generate a storyboard for each cluster based on the determined prompt information.

17. The computing device of claim 16, wherein the at least one processor is additionally configured to:
segment the script text into the text parts after obtaining the script text, and
the at least one processor is configured to perform at least one of:
an operation of segmenting the script text into the text parts based on a scene information of the script text, or
an operation of segmenting the script text into the text parts using a text segmentation module.

18. The computing device of claim 16, wherein the at least one processor is configured to:
individually determine each prompt information for each text part included in each cluster.

19. The computing device of claim 16, wherein the at least one processor is configured to:
determine integrated prompt information for each cluster based on the text parts included in each cluster, and
configured to generate each image storyboard for each text part included in each cluster based on the determined integrated prompt information.

20. The computing device of claim 16, wherein the at least one processor is configured to:
determine cluster-condition information for each cluster based on the location information associated with each cluster, and
wherein the cluster-condition information includes information that is not included in the script text, and
configured to generate the storyboard for each cluster based on the determined prompt information and the cluster-condition information.

* * * * *